(12) United States Patent
Yorimoto et al.

(10) Patent No.: US 9,654,671 B2
(45) Date of Patent: May 16, 2017

(54) IMAGING DEVICE, MEDIUM TYPE DETERMINING DEVICE, AND IMAGE FORMING APPARATUS

(71) Applicants: Mamoru Yorimoto, Kanagawa (JP); Nobuyuki Satoh, Kanagawa (JP); Kenji Morita, Tokyo (JP); Masaya Kawarada, Kanagawa (JP); Masahiro Hiranuma, Kanagawa (JP); Daisaku Horikawa, Kanagawa (JP)

(72) Inventors: Mamoru Yorimoto, Kanagawa (JP); Nobuyuki Satoh, Kanagawa (JP); Kenji Morita, Tokyo (JP); Masaya Kawarada, Kanagawa (JP); Masahiro Hiranuma, Kanagawa (JP); Daisaku Horikawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/851,383

(22) Filed: Sep. 11, 2015

(65) Prior Publication Data
US 2016/0080611 A1    Mar. 17, 2016

(30) Foreign Application Priority Data

Sep. 16, 2014    (JP) .................................. 2014-187746

(51) Int. Cl.
*H04N 1/00*    (2006.01)
*H04N 1/60*    (2006.01)
(Continued)

(52) U.S. Cl.
CPC ............ *H04N 1/6094* (2013.01); *G01J 3/501* (2013.01); *H04N 1/02895* (2013.01); *H04N 1/04* (2013.01);
(Continued)

(58) Field of Classification Search
None
See application file for complete search history.

(56) References Cited

U.S. PATENT DOCUMENTS 5,216,481 A * 6/1993 Minato ............. G01N 21/9036
                                                    250/223 B
8,902,466 B2   12/2014 Satoh
(Continued)

FOREIGN PATENT DOCUMENTS

JP    2012-063270    3/2012
JP    2012-194445    10/2012
JP    2013-051671    3/2013

OTHER PUBLICATIONS

U.S. Appl. No. 14/853,100, filed Sep. 14, 2015, Kawarada, et al.
(Continued)

*Primary Examiner* — Dov Popovici
(74) *Attorney, Agent, or Firm* — Oblon, McClelland, Maier & Neustadt, L.L.P.

(57) ABSTRACT

An imaging device including a light source; a two-dimensional image sensor that receives reflected light from a subject containing specular light of the light source and outputs an image of the subject; a light transmission member disposed in an optical path of light emitted from the light source to the subject; and a light shielding unit that, when a position on the subject at which light from the light source is regularly reflected and enters the two-dimensional image sensor is defined as a first specular position, whereas a position on the light transmission member at which light from the light source is regularly reflected and enters the two-dimensional image sensor is defined as a second specular position, shields the light directed from the light source toward the second specular position without shielding the light directed from the light source toward the first specular position.

8 Claims, 11 Drawing Sheets

(51) Int. Cl.
    *H04N 1/04*     (2006.01)
    *H04N 1/028*     (2006.01)
    *G01J 3/50*     (2006.01)

(52) U.S. Cl.
    CPC ......... *H04N 1/6044* (2013.01); *H04N 1/6075* (2013.01); *H04N 2201/0081* (2013.01); *H04N 2201/0082* (2013.01)

(56) References Cited

U.S. PATENT DOCUMENTS

| | | |
|---|---|---|
| 2012/0069411 A1 | 3/2012 | Satoh et al. |
| 2012/0139991 A1* | 6/2012 | Powers ............... B41J 11/009 347/19 |
| 2012/0236308 A1 | 9/2012 | Satoh |
| 2013/0027720 A1 | 1/2013 | Satoh |
| 2013/0027721 A1 | 1/2013 | Kobayashi et al. |
| 2013/0135484 A1 | 5/2013 | Satoh et al. |
| 2013/0208289 A1* | 8/2013 | Satoh ................... G01J 3/462 358/1.9 |
| 2013/0229671 A1 | 9/2013 | Yokozawa et al. |
| 2013/0242319 A1 | 9/2013 | Suzuki et al. |
| 2013/0242320 A1 | 9/2013 | Suzuki et al. |
| 2013/0242321 A1 | 9/2013 | Okada et al. |
| 2013/0242361 A1 | 9/2013 | Matsumoto et al. |
| 2013/0258368 A1 | 10/2013 | Shigemoto et al. |
| 2013/0258369 A1 | 10/2013 | Suzuki et al. |
| 2014/0218754 A1 | 8/2014 | Satoh et al. |
| 2015/0070737 A1 | 3/2015 | Hirata et al. |
| 2015/0085305 A1 | 3/2015 | Suzuki et al. |
| 2015/0109646 A1 | 4/2015 | Yokozawa et al. |
| 2015/0146053 A1 | 5/2015 | Satoh et al. |
| 2015/0158309 A1 | 6/2015 | Fujii et al. |
| 2015/0162372 A1 | 6/2015 | Yorimoto et al. |

OTHER PUBLICATIONS

U.S. Appl. No. 14/853,100, filed Sep. 14, 2015.
U.S. Appl. No. 14/565,182, filed Dec. 9, 2014.
U.S. Appl. No. 14/789,015, filed Jul. 1, 2015.
U.S. Appl. No. 14/753,729, filed Jun. 29, 2015.

* cited by examiner

IMAGING DEVICE, MEDIUM TYPE DETERMINING DEVICE, AND IMAGE FORMING APPARATUS

CROSS-REFERENCE TO RELATED APPLICATIONS

The present application claims priority to and incorporates by reference the entire contents of Japanese Patent Application No. 2014-187746 filed in Japan on Sep. 16, 2014.

BACKGROUND OF THE INVENTION

1. Field of the Invention

The present invention relates to an imaging device, a medium type determining device, and an image forming apparatus.

2. Description of the Related Art

Imaging devices are known that capture, by a two-dimensional image sensor, patterns (patches) printed on a print medium by an image forming apparatus using a coloring material such as ink and convert obtained RGB values of the patterns into color specification values (colorimetric values) in a standard color space, thereby performing the colorimetry of the patterns (refer to Japanese Laid-open Patent Publication No. 2012-63270, for example). The imaging device disclosed in Japanese Laid-open Patent Publication No. 2012-63270 is mounted on a carriage of an image forming apparatus and performs the colorimetry of patterns printed on a print medium by the image forming apparatus.

Meanwhile, the function to determine the type of print media on which images are printed is a function required for image forming apparatuses. For example, Japanese Laid-open Patent Publication No. 2012-194445 discloses an image forming apparatus having an optical sensor that determines the type of a print medium based on the intensity of specular light from the print medium.

For example, a configuration that receives specular light from a print medium using the two-dimensional image sensor included in the imaging device disclosed in Japanese Laid-open Patent Publication No. 2012-63270 can achieve a convenient imaging device that has both the function to perform the colorimetry of patterns and the function to determine the type of print media.

However, the imaging device disclosed in Japanese Laid-open Patent Publication No. 2012-63270 includes a light transmission member that transmits light in a housing, and when specular light from a print medium is received by the two-dimensional sensor, it is expected that specular light from the bottom face of the light transmission member also enters the two-dimensional sensor. If the optical images of these pieces of specular light overlap one another on a light-receiving face of the two-dimensional sensor, a problem arises in that the specular light from the print medium cannot accurately be detected.

SUMMARY OF THE INVENTION

According to the present invention, there is provided an imaging device comprising: a light source; a two-dimensional image sensor that receives reflected light from a subject containing specular light of the light source and outputs an image of the subject; a light transmission member disposed in an optical path of light emitted from the light source to the subject; and a light shielding unit that, when a position on the subject at which light from the light source is regularly reflected and enters the two-dimensional image sensor is defined as a first specular position, whereas a position on the light transmission member at which light from the light source is regularly reflected and enters the two-dimensional image sensor is defined as a second specular position, shields the light directed from the light source toward the second specular position without shielding the light directed from the light source toward the first specular position.

The present invention also provides a medium type determining device comprising: the above-described imaging device; and a determining unit that determines a type of a print medium on which an image is printed based on an image of the print medium output by the two-dimensional image sensor when the imaging device performs imaging of the print medium being the subject.

The present invention also provides an image forming apparatus comprising the above-described medium type determining device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes an imaging device, a medium type determining device, and an image forming apparatus according to an embodiment of the present invention in detail with reference to the attached drawings. Although the following embodiment exemplifies a serial head type inkjet printer as an example of the image forming apparatus to which the present invention is applied, the present invention can widely be applied to various types of image forming apparatuses that print images on print media.

Mechanical Configuration of Image Forming Apparatus

Figure 1:
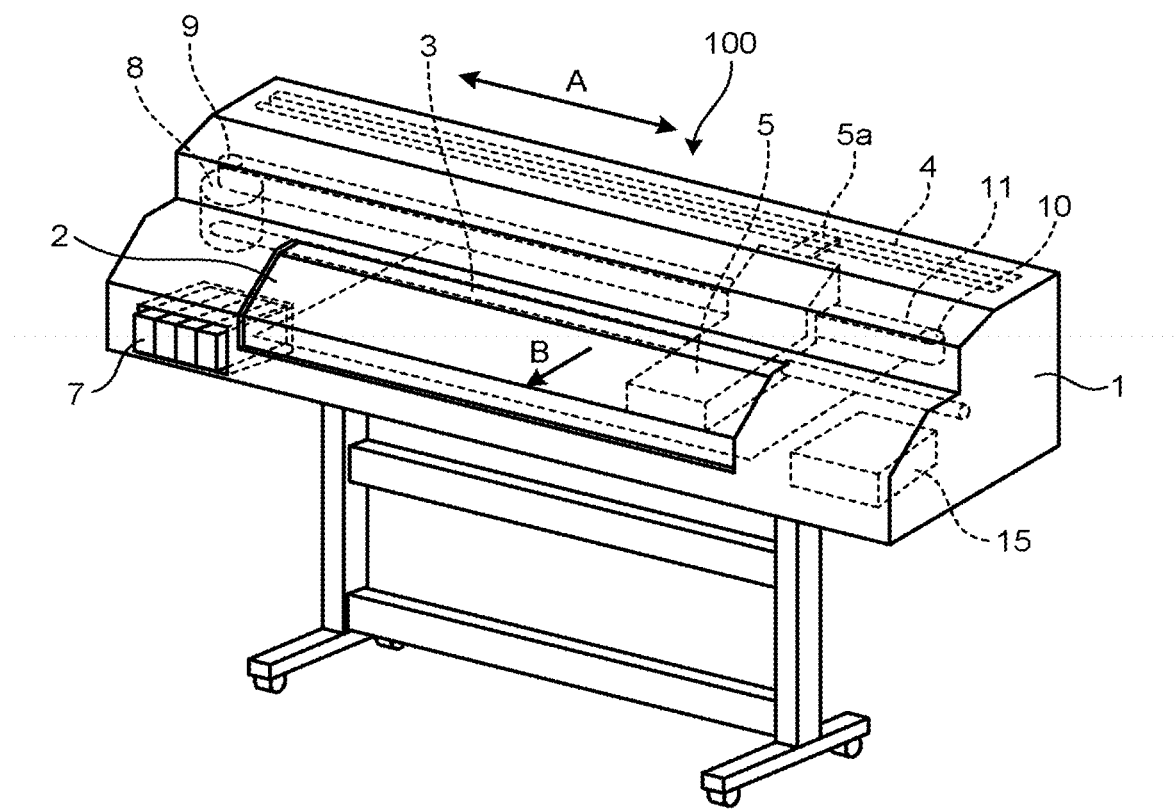
FIG. 1 is a see-through perspective view of the inside of an image forming apparatus.

First, the mechanical configuration of an image forming apparatus 100 according to the present embodiment will be described with reference to FIG. 1 to FIG. 3. FIG. 1 is a see-through perspective view of the inside of the image forming apparatus 100, FIG. 2 is a top view illustrating the mechanical configuration of the inside of the image forming apparatus 100, and FIG. 3 is a diagram illustrating an arrangement example of a recording head 6 installed in a carriage 5.

As illustrated in FIG. 1, the image forming apparatus 100 according to the present embodiment includes the carriage 5 that reciprocates in a main-scanning direction (the arrow A direction in the drawing). The carriage 5 is supported by a main guide rod 3 extending in the main-scanning direction. The carriage 5 includes a connecting piece 5a. The connecting piece 5a is engaged with a sub guide member 4 provided parallel to the main guide rod 3 and stabilizes the attitude of the carriage 5.

Figure 2:
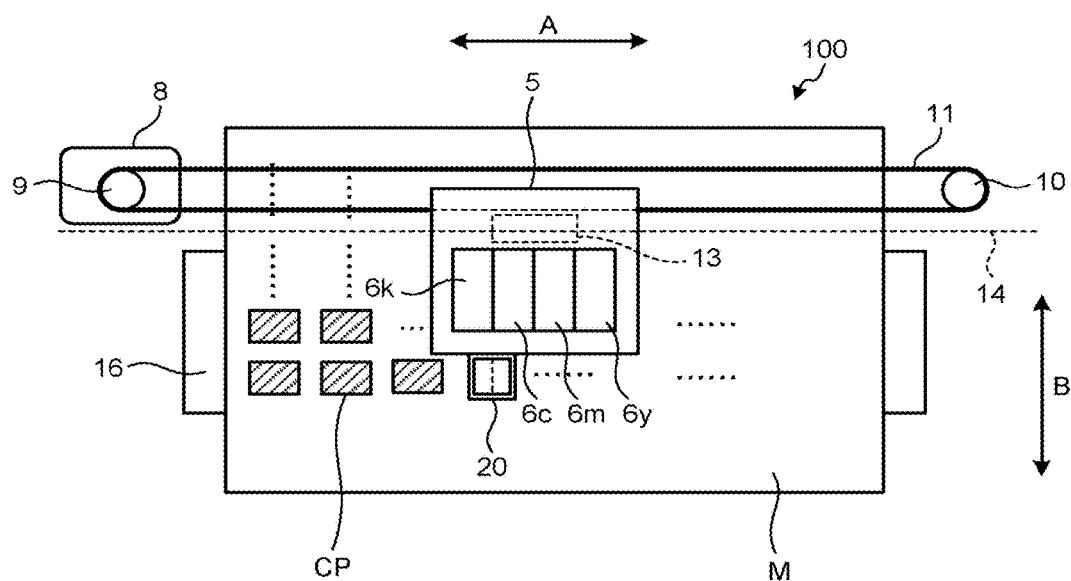
FIG. 2 is a top view illustrating a mechanical configuration of the inside of the image forming apparatus.
Figure 3:
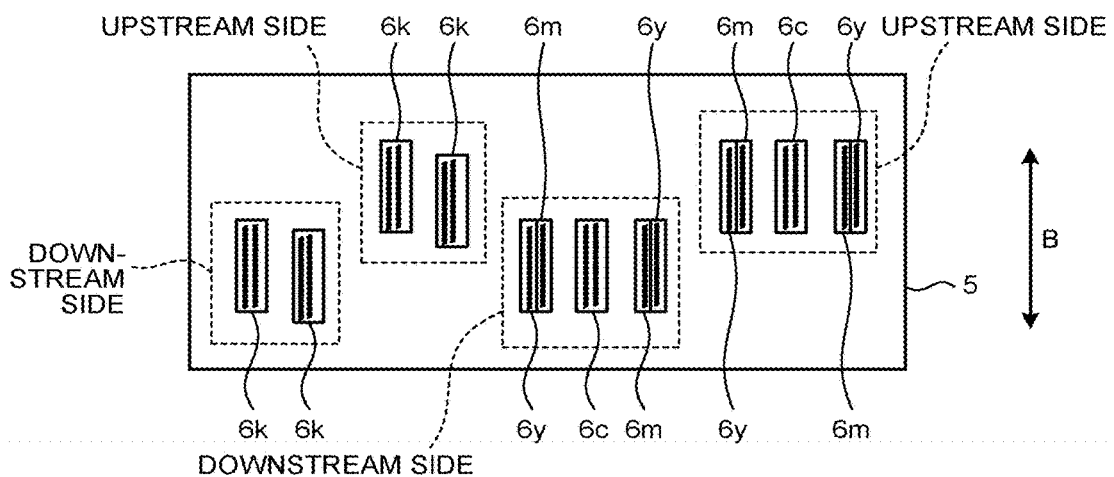
FIG. 3 is a diagram illustrating an arrangement example of a recording head installed in a carriage.

As illustrated in FIG. 2, the carriage 5 incorporates, for example, four recording heads 6y, 6m, 6c, and 6k. The recording head 6y is a recording head that discharges yellow ink. The recording head 6m is a recording head that discharges magenta ink. The recording head 6c is a recording head that discharges cyan ink. The recording head 6k is a recording head that discharges black ink. When these recording heads 6y, 6m, 6c, and 6k are collectively referred to in the following, they are referred to a recording head 6. The recording head 6 is supported by the carriage 5 so that its ink discharge face is directed downward (toward a print medium M).

A cartridge 7 as an ink supplier for supplying ink to the recording head 6 is not installed in the carriage 5 but is arranged at a certain position within the image forming apparatus 100. The cartridge 7 and the recording head 6 are connected through a pipe (not illustrated), and the ink is supplied from the cartridge 7 to the recording head 6 through the pipe.

The carriage 5 is coupled to a timing belt 11 stretched between a drive pulley 9 and a driven pulley 10. The drive pulley 9 rotates by the drive of a main-scanning motor 8. The driven pulley 10 has a mechanism to adjust the distance to the drive pulley 9 and has a role of giving certain tension to the timing belt 11. The carriage 5 reciprocates in the main-scanning direction through the feeding operation of the timing belt 11 by the drive of the main-scanning motor 8. As illustrated in FIG. 2, for example, the movement of the carriage 5 in the main-scanning direction is controlled based on an encoder value obtained by the detection of a mark of an encoder sheet 14 by an encoder sensor 13 provided in the carriage 5.

The image forming apparatus 100 according to the present embodiment includes a maintenance mechanism 15 for maintaining the reliability of the recording head 6. The maintenance mechanism 15 performs the cleaning and capping of the recording head 6, the discharging of unnecessary ink from the recording head 6, or the like.

As illustrated in FIG. 2, a platen 16 is arranged at a position facing the discharge face of the recording head 6. The platen 16 supports the print medium M when the recording head 6 discharges ink onto the print medium M. The image forming apparatus 100 according to the present embodiment is a wide format machine, whose travel distance in the main-scanning direction of the carriage 5 is longer. For this reason, the platen 16 is configured by connecting a plurality of plate members in the main-scanning direction (the travel direction of the carriage 5). The print medium M is held between conveying rollers that are driven by a sub-scanning motor (not illustrated) and is intermittently conveyed in a sub-scanning direction (a direction orthogonal to the main-scanning direction) indicated by the arrow B on the platen 16.

The recording head 6 includes a plurality of nozzle arrays, and the nozzle arrays discharge ink onto the print medium M conveyed on the platen 16, thereby printing an image on the print medium M. In the present embodiment, in order to secure the width of an image that can be printed by one scanning of the carriage 5 to be wide, as illustrated in FIG. 3, the carriages 5 incorporates upstream side recording heads 6 and downstream side recording heads 6. The number of the recording heads 6k that discharge black ink installed in the carriage 5 is twice as many as that of the recording heads 6y, 6m, and 6c that discharge color ink. The recording heads 6y and 6m are arranged laterally separated from each other. This arrangement is intended to match a color overlapping order in the reciprocating operation of the carriage 5 to prevent color from being different between the forward scanning and the backward scanning. The arrangement of the recording head 6 illustrated in FIG. 3 is an example, and the arrangement illustrated in FIG. 3 is not a limiting example.

The components constituting the image forming apparatus 100 according to the present embodiment are arranged within an exterior body 1. The exterior body 1 includes a cover member 2 in an openable/closable manner. During the maintenance of the image forming apparatus 100 or at the time of occurrence of paper jam, the cover member 2 is opened, and then work on the components arranged within the exterior body 1 can be performed.

The image forming apparatus 100 according to the present embodiment intermittently conveys the print medium M in the sub-scanning direction (the arrow B direction in the drawing), and while the conveyance of the print medium M in the sub-scanning direction is stopped, discharges ink from the nozzle arrays of the recording head 6 installed in the carriage 5 onto the print medium M on the platen 16, while moving the carriage 5 in the main-scanning direction, thereby printing an image on the print medium M.

At the time of color adjustment that performs color adjustment of the image forming apparatus 100 in particular, ink is discharged from the recording head 6 onto the print medium M on the platen 16 to print many colorimetric patterns CP, and colorimetry on the colorimetric patterns CP is performed. The colorimetric patterns CP are actually formed on the print media M by the image forming apparatus 100 using ink and reflect characteristics unique to the image forming apparatus 100. Thus, using colorimetric values of these colorimetric patterns CP, a device profile that describes the characteristics unique to the image forming apparatus 100 can be generated or modified. Performing color transformation between a standard color space and device-dependent color based on the device profile enables the image forming apparatus 100 to output a highly reproducible image.

The image forming apparatus 100 according to the present embodiment includes a colorimetric camera (an imaging device) 20 having a function to image the colorimetric patterns CP printed on the print medium M and calculate the colorimetric values. As illustrated in FIG. 2, the colorimetric camera 20 is supported by the carriage 5 in which the recording head 6 is installed. The colorimetric camera 20 performs imaging when it moves on the print medium M on which colorimetric patterns CP are printed through the conveyance of the print medium M and the movement of the carriage 5 and reaches positions facing the respective colorimetric patterns CP. Based on RGB values of the colorimetric patterns CP obtained by the imaging, the colorimetric values of the colorimetric patterns CP are calculated.

The image forming apparatus 100 according to the present embodiment determines the type of the print medium M to be used in printing using the colorimetric camera 20. For example, the colorimetric camera 20 has a function (a medium type determining device) that, before performing the colorimetry of the respective colorimetric patterns CP printed on the print medium M, performs imaging of a margin of the print medium M, in which no colorimetric pattern CP is formed, as a subject, and based on the obtained image, determines the type of the print medium M. When determining the type of the print medium M, the colorimetric camera 20 causes a medium type determining light source described below to emit light to the margin of the print medium M that is the subject. The medium type determining light source is arranged so that specular light from the subject enters a two-dimensional image sensor described below. The colorimetric camera 20 receives the specular light from the subject by the two-dimensional image sensor and determines the type of the print medium M based on the intensity of the specular light, for example.

Specific Example of Colorimetric Camera

Figure 4A:
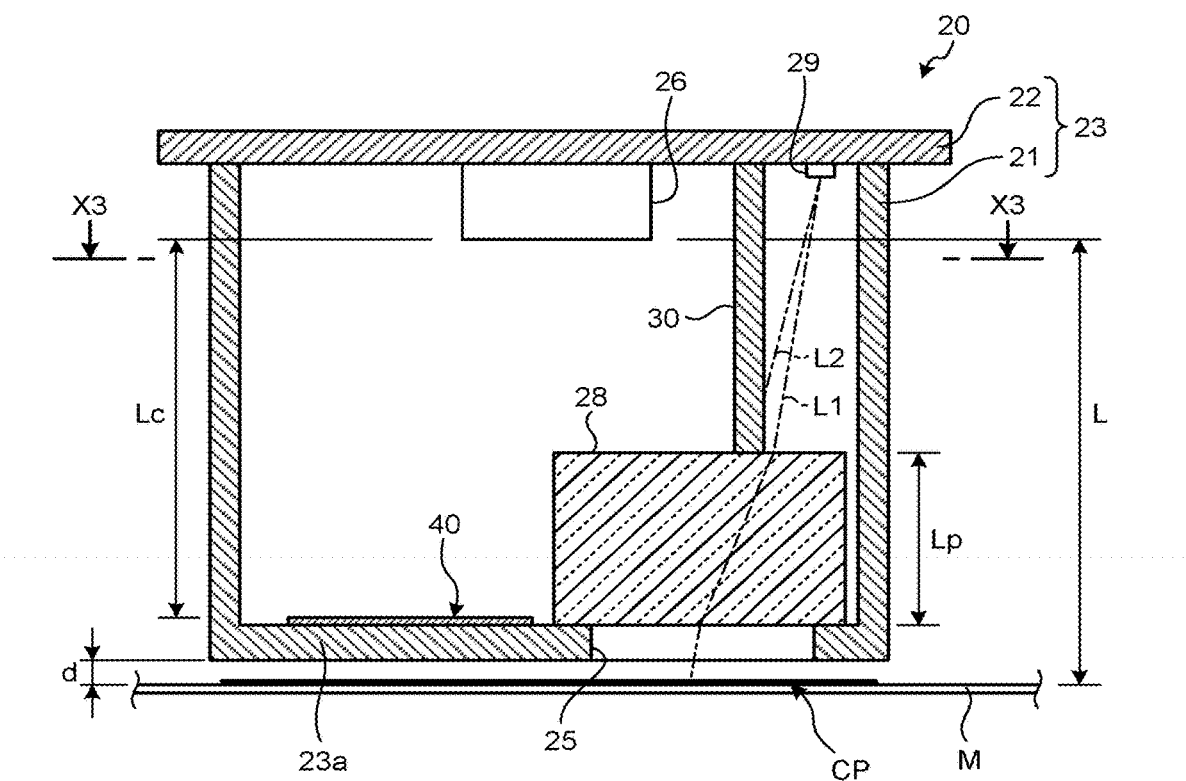
FIG. 4A is a vertical sectional view (a sectional view along the X1-X1 line in FIG. 4C) of a colorimetric camera.
Figure 4B:
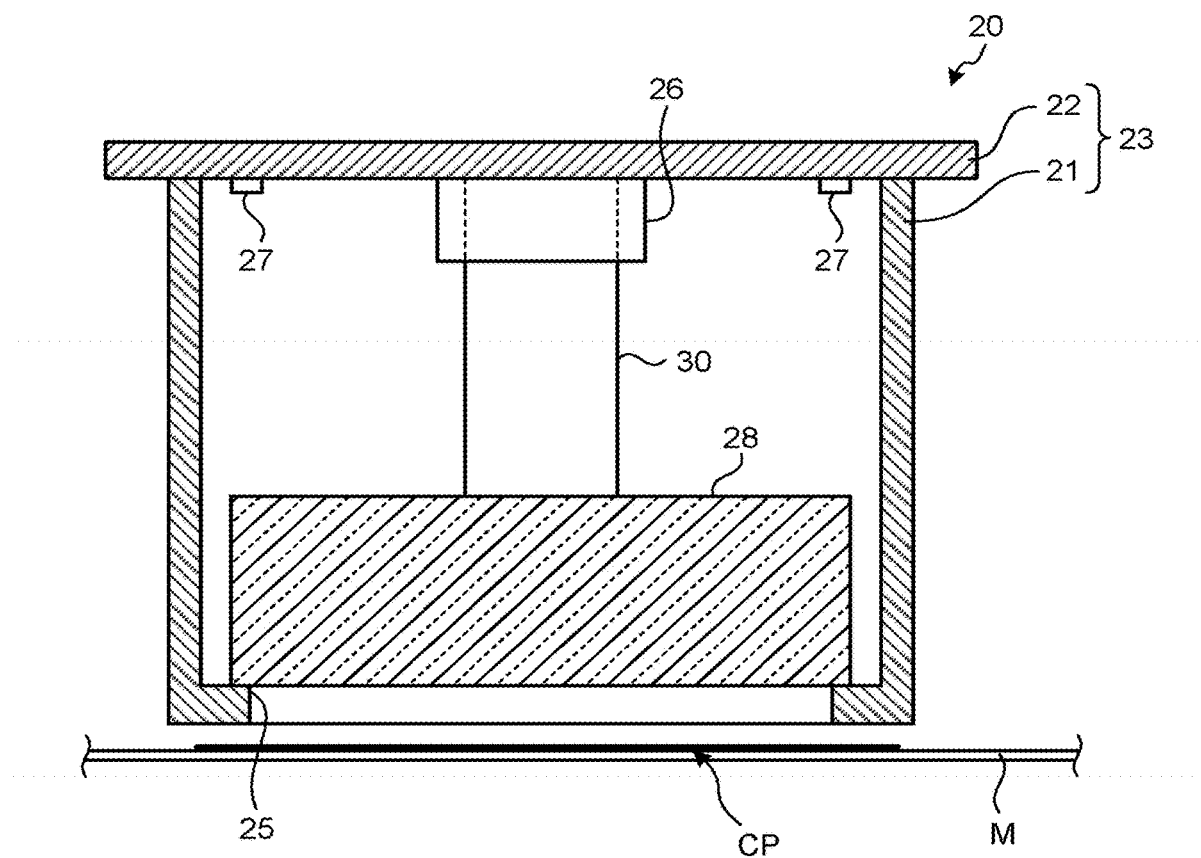
FIG. 4B is a vertical sectional view (a sectional view along the X2-X2 line in FIG. 4C) of the colorimetric camera.
Figure 4C:
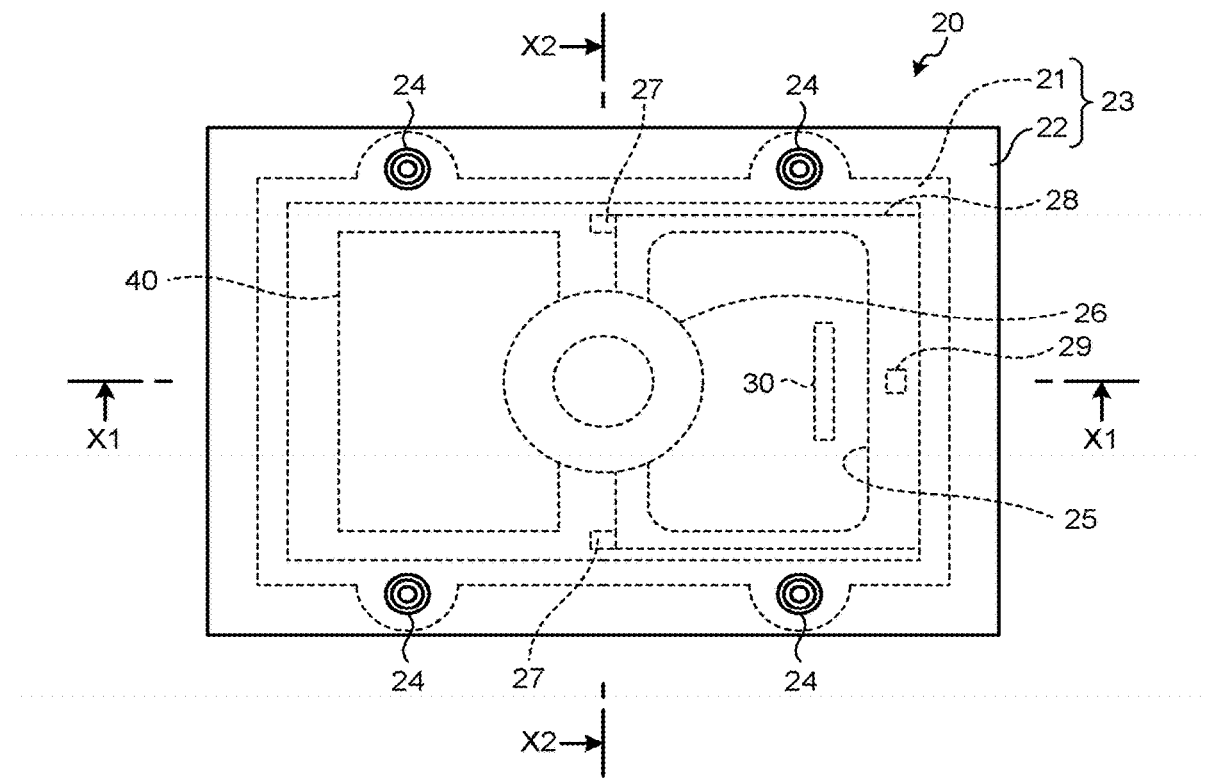
FIG. 4C is a see-through top view of the inside of a housing of the colorimetric camera.
Figure 4D:
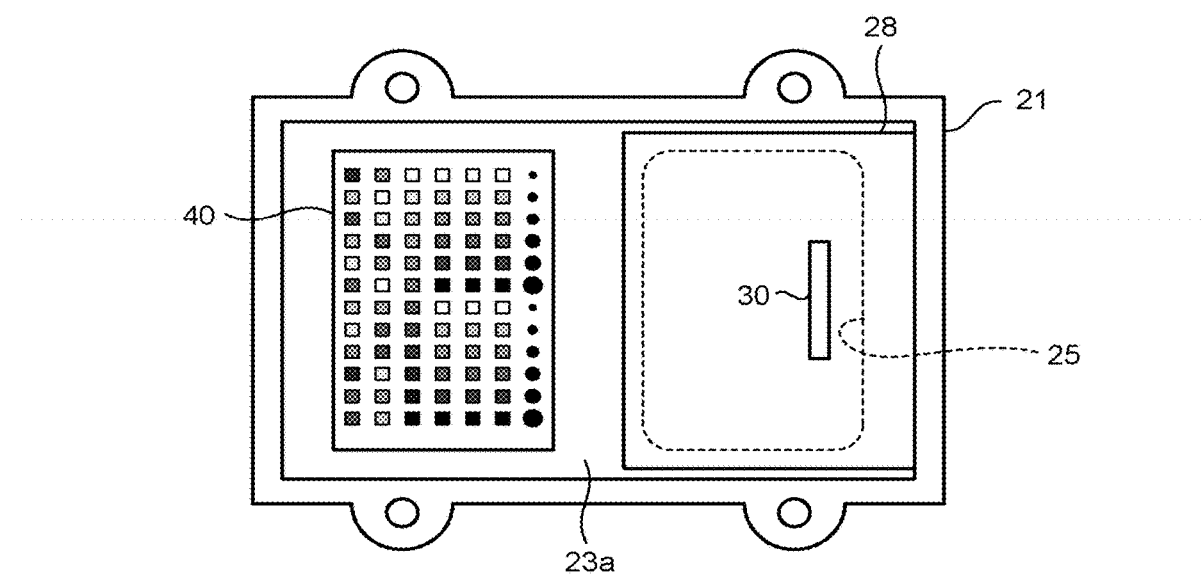
FIG. 4D is a plan view of a bottom face of the housing from the X3 direction in FIG. 4A.

Next, a specific example of the colorimetric camera 20 will be described in detail with reference to FIG. 4A to FIG. 4D. FIG. 4A to FIG. 4D are diagrams illustrating an example of the mechanical configuration of the colorimetric camera 20: FIG. 4A is a vertical sectional view (a sectional view along the X1-X1 line in FIG. 4C) of the colorimetric camera 20; FIG. 4B is a vertical sectional view (a sectional view along the X2-X2 line in FIG. 4C) of the colorimetric camera 20; FIG. 4C is a see-through top view of the inside of a housing 23 of the colorimetric camera 20; and FIG. 4D is a plan view of a bottom face 23a of the housing 23 from the X3 direction in FIG. 4A.

The colorimetric camera 20 includes a housing 23 formed by combining a frame body 21 and a substrate 22. The frame body 21 is formed in a bottomed cylindrical shape whose one end as the upper face of the housing 23 is open. The substrate 22 is fastened to the frame body 21 with a fastening member 24 to be integral with the frame body 21 so as to close the open end of the frame body 21 and form the upper face of the housing 23.

The housing 23 is fixed to the carriage 5 so that its bottom face 23a faces the print medium M on the platen 16 with a certain gap d therebetween. The bottom face 23a of the housing 23 facing the print medium M has an opening 25 that enables a subject (the colorimetric patterns CP at the time of color adjustment or the margin of the print medium M in determining the type of the print medium M) to be imaged from within the housing 23.

The housing 23 includes a two-dimensional image sensor 26 that performs capturing. The two-dimensional image sensor 26 includes an imaging device such as a CCD sensor or a CMOS sensor and an imaging forming lens and is mounted on, for example, the inner face (component mounting face) of the substrate 22 so that the light-receiving face faces the bottom face 23a of the housing 23.

A reference chart 40 is disposed on the inner face of the bottom face 23a of the housing 23 so as to be adjacent to the opening 25. The reference chart 40 is imaged together with the colorimetric patterns CP by the two-dimensional image sensor 26 when colorimetry is performed on the colorimetric patterns CP. In other words, the reference chart 40 is disposed within the housing 23 so as to be contained in the area to be imaged of the two-dimensional image sensor 26 together with the colorimetric patterns CP outside the housing 23. The reference chart 40 will be described in detail below.

The housing 23 includes a colorimetric light source 27 for irradiating the area to be imaged of the two-dimensional image sensor 26 with diffused light substantially uniformly in performing the colorimetry of colorimetric patterns CP. Examples of the colorimetric light source 27 include a light emitting diode (LED). The present embodiment uses two LEDs as the colorimetric light source 27. These LEDs used as the colorimetric light source 27 are mounted on the inner face of the substrate 22, for example. The colorimetric light source 27 is only required to be disposed so that the area to be imaged of the two-dimensional image sensor 26 can be irradiated with light substantially uniformly and is not necessarily required to be directly mounted on the substrate 22. Although the present embodiment uses LEDs as the colorimetric light source 27, the type of the light source is not limited to the LED. The colorimetric light source 27 may be an organic EL, for example. When the organic EL is used as the colorimetric light source 27, irradiation light having a spectroscopic distribution close to that of sunlight can be obtained, and improvement in colorimetric accuracy can be expected.

In order to irradiate the colorimetric patterns CP outside the housing 23 with light on the same irradiation conditions as the reference chart 40 disposed within the housing 23, it is necessary that the colorimetric patterns CP be irradiated only with the irradiation light from the colorimetric light source 27 by preventing the colorimetric patterns CP from being irradiated with external light. In order to prevent the colorimetric patterns CP from being irradiated with the external light, it is effective to reduce the gap d between the bottom face 23a of the housing 23 and the print medium M, thereby blocking the external light directed toward the colorimetric patterns CP with the housing 23. However, if the gap d between the bottom face 23a of the housing 23 and the print medium M is reduced excessively, the print medium M may come into contact with the bottom face 23a of the housing 23, which may not be able to appropriately perform imaging. Thus, considering the planarity of the print medium M, the gap d between the bottom face 23a of the housing 23 and the print medium M is preferably set at a smaller value to the extent that the print medium M does not come into contact with the bottom face 23a of the housing 23. If the gap d between the bottom face 23a of the housing 23 and the print medium M is set at about 1 mm to 2 mm, for example, the print medium M does not come into contact with the bottom face 23a of the housing 23, and the colorimetric patterns CP formed on the print medium M are effectively prevented from being irradiated with the external light.

The housing 23 includes an optical path length changing member 28 (a light transmission member). The optical path length changing member 28 is an optical element having a refractive index n (n is any desired number) having sufficient transmittance to the irradiation light. The optical path length changing member 28 is disposed in an optical path between the colorimetric patterns CP outside the housing 23 and the two-dimensional image sensor 26 and has the function to bring an imaging plane of an optical image of the colorimetric patterns CP close to an imaging plane of an optical image of the reference chart 40. In other words, the colorimetric camera 20 according to the present embodiment disposes the optical path length changing member 28 in the optical path between the colorimetric patterns CP and the two-dimensional image sensor 26, thereby enabling an image in focus on both the colorimetric patterns CP and the reference chart 40 to be imaged.

When light passes through the optical path length changing member 28, the optical path length extends in accordance with the refractive index n of the optical path length changing member 28, by which an image appears in a floated manner. A floating amount C of the image can be determined by the following formula:

$$C=Lp(1-1/n)$$

where Lp is the length of the optical path length changing member 28 in the optical axial direction.

The distance L between the principal point of the imaging forming lens of the two-dimensional image sensor 26 and a front side focal plane (an imaging plane) of an optical image passing through the optical path length changing member 28 can be determined by the following formula:

$$L=Lc+Lp(1-1/n)$$

where Lc is the distance between the principal point of the imaging forming lens of the two-dimensional image sensor 26 and the reference chart 40.

Where the refractive index n of the optical path length changing member 28 is 1.5, L=Lc+Lp(1/3), thereby enabling the optical path of the optical image passing through the optical path length changing member 28 to be extended by about ⅓ of the length Lp of the optical path length changing member 28 in the optical axial direction. In this case, where Lp=9 [mm], for example, L=Lc+3 [mm]. Thus, imaging is performed with the difference between the distance from the two-dimensional image sensor 26 to the reference chart 40 and the distance therefrom to the colorimetric patterns CP being 3 mm, thereby enabling both a rear side focal plane (an imaging plane) of an optical image of the reference chart 40 and a rear side focal plane (an imaging plane) of an optical image of the colorimetric patterns CP to be aligned to the light-receiving face of the two-dimensional image sensor 26 and enabling an image in focus on both the colorimetric patterns CP and the reference chart 40 to be imaged.

The housing 23 includes a medium type determining light source 29 that irradiates the margin of the print medium M with light in determining the type of the print medium M. The medium type determining light source 29 is disposed at a position through which specular light emitted from the light source and regularly reflected by the margin of the print medium M enters the two-dimensional image sensor 26. The colorimetric camera 20 according to the present embodiment performs imaging by the two-dimensional image sensor 26 with the margin of the print medium M irradiated with the light from the medium type determining light source 29 as a subject. The intensity of the specular light on the margin of the print medium M is determined from an obtained image, and based on the intensity of the specular light, the type of the print medium M is determined.

The colorimetric camera 20 according to the present embodiment performs imaging by the two-dimensional image sensor 26 by turning on only the colorimetric light source 27 when performing the colorimetry of the colorimetric patterns CP and by turning on only the medium type determining light source 29 when determining the type of the print medium M. The optical path length changing member 28 is a light transmission member having the function to bring the imaging plane of the optical image of the colorimetric patterns CP close to the imaging plane of the optical image of the reference chart 40 when performing the colorimetry of the colorimetric patterns CP. However, the optical path length changing member 28 is disposed in the optical path of the light directed from the medium type determining light source 29 toward the subject outside the housing 23. For this reason, in determining the type of the print medium M, the light from the medium type determining light source 29 enters the optical path length changing member 28. When the specular light regularly reflected by, for example, the bottom face of the optical path length changing member 28 enters the two-dimensional image sensor 26, an obstacle to the function to determine the type of the print medium M may be constituted. In other words, in the image imaged by the two-dimensional image sensor 26, when the specular light regularly reflected by, for example, the bottom face of the optical path length changing member 28 interferes with the specular light on the margin of the print medium M, the intensity of the specular light on the margin of the print medium M cannot accurately be determined, thus leading to inability to accurately determine the type of the print medium M.

Given this situation, in the colorimetric camera 20 according to the present embodiment, the housing 23 includes a light shielding wall 30 (an example of a light shielding unit) for preventing the specular light on the bottom face of the optical path length changing member 28 from entering the two-dimensional image sensor 26 when the medium type determining light source 29 is turned on. Specifically, a position on the margin of the print medium M that is the subject at which the light from the medium type determining light source 29 is regularly reflected and enters the two-dimensional image sensor 26 is defined as a first specular position, whereas a position on the bottom face of the optical path length changing member 28 at which the light from the medium type determining light source 29 is regularly reflected and enters the two-dimensional image sensor 26 is defined as a second specular position. In this situation, the light shielding wall 30 is arranged within the housing 23 so as to shield light L2 (refer to FIG. 4A) directed from the medium type determining light source 29 toward the second specular position without shielding light L1 (refer to FIG. 4A) directed from the medium type determining light source 29 toward the first specular position.

Figure 5:
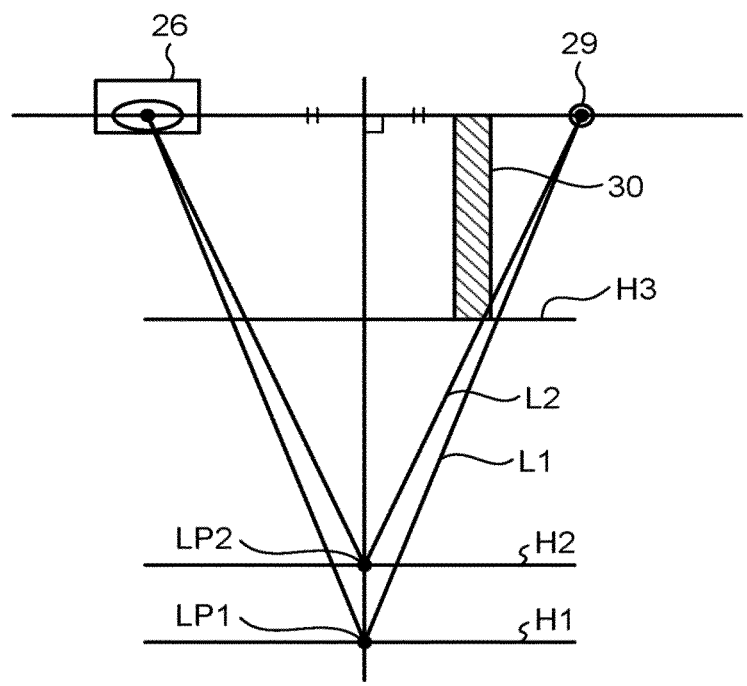
FIG. 5 is a diagram illustrating a first specular position, a second specular position, and a position at which a light shielding wall is arranged.

The following describes a position at which the light shielding wall 30 is arranged within the housing 23 in more detail with reference to FIG. 5. FIG. 5 is a diagram illustrating a first specular position LP1, a second specular position LP2, and a position at which the light shielding wall 30 is arranged. H1 in the drawing represents the surface of the subject (the margin of the print medium M), H2 represents the bottom face (a face facing the opening 25) of the optical path length changing member 28, and H3 represents the top face (a face facing the substrate 22) of the optical path length changing member 28.

In order to make the description easy to understand, the refraction of light by the optical path length changing member 28 is neglected. It is assumed that the height position of the imaging forming lens of the two-dimensional image sensor 26 and the height position of the medium type determining light source 29 are the same and that the line segment connecting between the imaging forming lens of the two-dimensional image sensor 26 and the medium type determining light source 29 is parallel to the surface H1 of the subject, the bottom face H2 of the optical path length changing member 28, and the top face H3 of the optical path length changing member 28. The distance from the two-dimensional image sensor 26 to the surface H1 of the subject in the height direction (the optical axial direction of the two-dimensional image sensor 26) is a fixed value obtained by adding the gap d to the size of the frame body 21.

When the height position of the imaging forming lens of the two-dimensional image sensor 26 and the height position of the medium type determining light source 29 are the same, the first specular position LP1, which is a specular position of the medium type determining light source 29 on the surface H1 of the subject (the margin of the print medium M), is a point of intersection at which the perpendicular bisector of the line segment connecting between the imaging forming lens of the two-dimensional image sensor 26 and the medium type determining light source 29 intersects the surface H1 of the subject. The second specular position LP2, which is a specular position of the medium type determining light source 29 on the bottom face H2 of the optical path length changing member 28, is a point of intersection at which the perpendicular bisector of the line segment connecting between the imaging forming lens of the two-dimensional image sensor 26 and the medium type determining light source 29 intersects the bottom face H2 of the optical path length changing member 28.

As illustrated in FIG. 5, the light shielding wall 30 is arranged so as not to shield the light L1 directed from the medium type determining light source 29 toward the first specular position LP1 and so as to shield the light L2 directed from the medium type determining light source 29 toward the second specular position LP2. The light shielding wall 30 is only required to be arranged so as to shield the light L2 directed from the medium type determining light source 29 toward the second specular position LP2 without shielding the light L1 directed from the medium type determining light source 29 toward the first specular position LP1 and is not necessarily required to be arranged so as to be in contact with the top face H3 of the optical path length changing member 28 as illustrated in FIG. 5.

By arranging the light shielding wall 30 as described above, the specular light at the second specular position LP2 can be prevented from entering the two-dimensional image sensor 26, and the inconvenience does not occur that the specular light at the second specular position LP2 interferes with the specular light at the first specular position LP1 in the image imaged by the two-dimensional image sensor 26. Consequently, the intensity of the specular light in the margin of the print medium M can accurately be determined from the image imaged by the two-dimensional image sensor 26, and the type of the print medium M can accurately be determined.

As illustrated in FIG. 4A and FIG. 4B, the colorimetric camera 20 of the present embodiment arranges the light shielding wall 30 configured of a long, plate-shaped member so that one end thereof is in contact with the substrate 22 constituting the housing 23 and the other end thereof is in contact with the top face of the optical path length changing member 28. Specifically, the light shielding wall 30 is arranged so as to be fitted in the gap between the substrate 22 constituting the housing 23 and the optical path length changing member 28, thereby causing the light shielding wall 30 to have the function to fix the optical path length changing member 28 within the housing 23. In other words, a fixed member for fixing the optical path length changing member 28 within the housing 23 is arranged so as not to shield the light L1 directed from the medium type determining light source 29 toward the first specular position LP1 and so as to shield the light L2 directed from the medium type determining light source 29 toward the second specular position LP2, and the fixed member is used as the light shielding wall 30.

With this configuration, it is not necessary to separately provide any exclusive fixing member for fixing the optical path length changing member 28 within the housing 23 in addition to the light shielding wall 30, thus achieving a cost reduction by a reduction in a parts count, space-saving within the housing 23, downsizing of the apparatus, and the like.

Specific Example of Reference Chart

Figure 6:
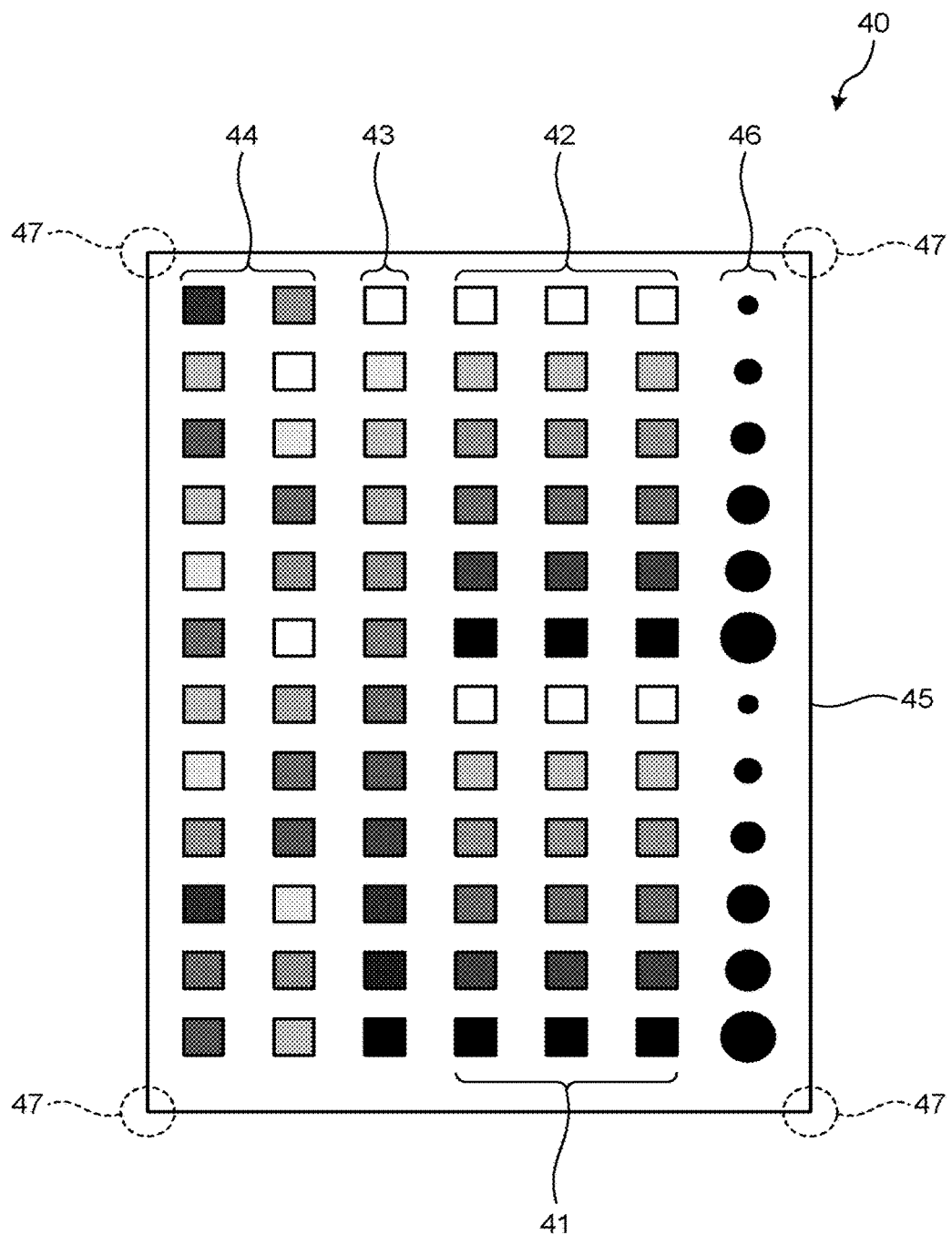
FIG. 6 is a diagram illustrating a specific example of a reference chart.

Next, the reference chart 40 arranged within the housing 23 of the colorimetric camera 20 will be described in detail with reference to FIG. 6. FIG. 6 is a diagram illustrating a specific example of the reference chart 40.

The reference chart 40 illustrated in FIG. 6 contains a plurality of reference patch arrays 41 to 44 that arrange colorimetric reference patches, a dot diameter measuring pattern array 46, a distance measuring line 45, and chart position specifying markers 47.

The reference patch arrays 41 to 44 contain the reference patch array 41 that arranges YMCK primary color reference patches in order of gradation, the reference patch array 42 that arranges RGB secondary color reference patches in order of gradation, the reference patch array 43 that arranges gray scale reference patches in order of gradation, and the reference patch array 44 that arranges tertiary color reference patches. The dot diameter measuring pattern array 46 is a pattern array for geometrical shape measurement that arranges circular patterns having different sizes in order of size and can be used for measuring a dot diameter of an image printed on the print medium M.

The distance measuring line 45 is formed as a rectangular frame that surrounds the reference patch arrays 41 to 44 and the dot diameter measuring pattern array 46. The chart position specifying markers 47 are arranged at the four corners of the distance measuring line 45 and function as markers that specify the positions of the respective reference patches. The distance measuring line 45 and the chart position specifying markers 47 at the four corners are specified from an image of the reference chart 40 imaged by the two-dimensional image sensor 26, thereby enabling the position of the reference chart 40 and the positions of the respective reference patches and patterns to be specified.

The respective reference patches constituting the colorimetric reference patch arrays 41 to 44 are used as references of hues reflecting imaging conditions of the colorimetric camera 20. The configuration of the colorimetric reference patch arrays 41 to 44 arranged on the reference chart 40 is not limited to the example illustrated in FIG. 6, and any desired reference patch array can be used. For example, a reference patch that can specify a color range as widely as possible may be used, and the YMCK primary color reference patch array 41 and the gray scale reference patch array 43 may be formed by patches of colorimetric values of ink used in the image forming apparatus 100. The RGB secondary color reference patch array 42 may be formed by patches of colorimetric values that can be developed by ink used in the image forming apparatus 100 or may be reference color charts whose colorimetric values are defined such as Japan Color.

Although the present embodiment uses the reference chart 40 having the reference patch arrays 41 to 44 of the general patch (color chart) shape, the reference chart 40 is not necessarily required to be a form having such reference patch arrays 41 to 44. The reference chart 40 is only required to be configured with a plurality of colors usable for colorimetry arranged so that their respective positions can be specified.

The reference chart 40 is arranged adjacent to the opening 25 on the bottom face 23a of the housing 23 of the colorimetric camera 20, and it can be imaged simultaneously with the colorimetric patterns CP that is a colorimetric object by the two-dimensional image sensor 26. Being imaged simultaneously means that one frame of image data containing the colorimetric patterns CP being a colorimetric object and the reference chart 40 is acquired. In other words, acquisition of image data containing the colorimetric patterns CP and the reference chart 40 within one frame, even when there is a time difference in pixel-by-pixel data acquisition, means that the colorimetric patterns CP and the reference chart 40 are simultaneously imaged.

The above-described mechanical configuration of the colorimetric camera 20 is an example, and that is not limiting. The colorimetric camera 20 according to the present embodiment is only required to be able to at least perform the colorimetry of the colorimetric patterns CP and determine the paper type of the print medium M using the two-dimensional image sensor 26, and various alterations and modifications can be applied to the above configuration.

Although the present embodiment has a function as a medium type determining apparatus in the colorimetric camera 20 that performs the colorimetry of the colorimetric patterns CP, the medium type determining apparatus may be implemented by another imaging device other than the colorimetric camera 20. In this case, the other imaging device other than the colorimetric camera 20 includes a two-dimensional image sensor similar to the two-dimensional image sensor 26 and a light source corresponding to the medium type determining light source 29. The imaging device other than the colorimetric camera 20 includes a light transmission member disposed in an optical path of light emitted from the light source to the subject and a light shielding unit corresponding to the above light shielding wall 30.

Outline of Control Mechanism of Image Forming Apparatus

Figure 7:
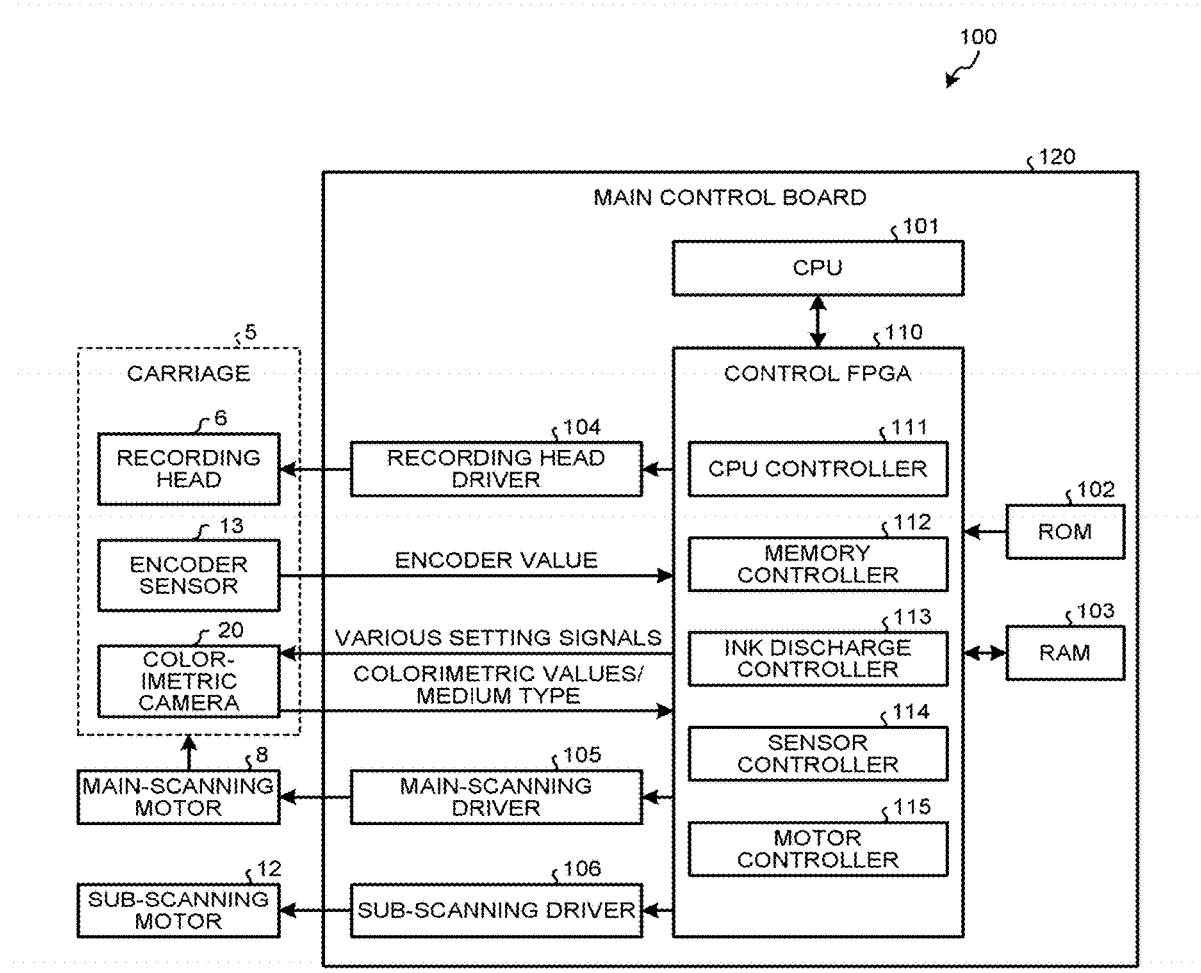
FIG. 7 is a control block diagram of the image forming apparatus.

Next, a control mechanism of the image forming apparatus 100 according to the present embodiment will be outlined with reference to FIG. 7. FIG. 7 is a block diagram outlining the control mechanism of the image forming apparatus 100.

As illustrated in FIG. 7, the image forming apparatus 100 according to the present embodiment includes a CPU 101, a ROM 102, a RAM 103, a recording head driver 104, a main-scanning driver 105, a sub-scanning driver 106, a control field-programmable gate array (FPGA) 110, the recording head 6, the colorimetric camera 20, the encoder sensor 13, the main-scanning motor 8, and a sub-scanning motor 12. The CPU 101, the ROM 102, the RAM 103, the recording head driver 104, the main-scanning driver 105, the sub-scanning driver 106, and the control FPGA 110 are mounted on a main control board 120. The recording head 6, the encoder sensor 13, and the colorimetric camera 20 are mounted on the carriage 5 as described above.

The CPU 101 controls the entire image forming apparatus 100. For example, the CPU 101, while using the RAM 103 as a work area, executes various control programs stored in the ROM 102 and outputs control commands for controlling various operations in the image forming apparatus 100.

The recording head driver 104, the main-scanning driver 105, and the sub-scanning driver 106 are drivers for driving the recording head 6, the main-scanning motor 8, and the sub-scanning motor 12, respectively.

The control FPGA 110 controls the various operations in the image forming apparatus 100 in cooperation with the CPU 101. The control FPGA 110 includes as functional components, for example, a CPU controller 111, a memory controller 112, an ink discharge controller 113, a sensor controller 114, and a motor controller 115.

The CPU controller 111 communicates with the CPU 101, thereby transmitting various types of information acquired by the control FPGA 110 to the CPU 101 and inputting the control commands output from the CPU 101.

The memory controller 112 performs memory control for causing the CPU 101 to access the ROM 102 and the RAM 103.

The ink discharge controller 113 controls the operation of the recording head driver 104 in accordance with the control commands from the CPU 101, thereby controlling the discharging timing of ink from the recording head 6 driven by the recording head driver 104.

The sensor controller 114 performs processing on sensor signals such as an encoder value output from the encoder sensor 13.

The motor controller 115 controls the operation of the main-scanning driver 105 in accordance with the control commands from the CPU 101, thereby controlling the main-scanning motor 8 driven by the main-scanning driver 105 and controlling the movement of the carriage 5 in the main-scanning direction. The motor controller 115 controls the operation of the sub-scanning driver 106 in accordance with the control commands from the CPU 101, thereby controlling the sub-scanning motor 12 driven by the sub-scanning driver 106 and controlling the movement of the print medium M in the sub-scanning direction on the platen 16.

The above components are examples of control functions implemented by the control FPGA 110, and various control functions in addition to these may be implemented by the control FPGA 110. The whole or part of the above control functions may be implemented by computer programs executed by the CPU 101 or another general-purpose CPU. Part of the above control functions may be implemented by special-purpose hardware such as another FPGA other than the control FPGA 110 and an application specific integrated circuit (ASIC).

The recording head 6 is driven by the recording head driver 104 whose operation is controlled by the CPU 101 and the control FPGA 110 and discharges ink onto the print medium M on the platen 16 to print an image.

The encoder sensor 13 outputs the encoder value obtained by detecting the mark of the encoder sheet 14 to the control FPGA 110. The encoder value is then sent from the control FPGA 110 to the CPU 101 and is used for, for example, calculating the position and speed of the carriage 5. Based on the position and speed of the carriage 5 calculated from the encoder value, the CPU 101 generates and outputs control commands for controlling the main-scanning motor 8.

As described above, the colorimetric camera 20 images the colorimetric patterns CP formed on the print medium M together with the reference chart 40 at the time of the color adjustment of the image forming apparatus 100, and based on the RGB values of the colorimetric patterns CP and the RGB values of respective reference patches of the reference chart 40 obtained from the image, calculates the colorimetric values (which are color specification values in a standard color space and are L*a*b* values in an L*a*b* color space, for example) of the colorimetric patterns CP. The colorimetric values of the colorimetric patterns CP calculated by the colorimetric camera 20 are sent to the CPU 101 through the control FPGA 110. A method disclosed in Japanese Laid-open Patent Publication No. 2013-051671, for example, can be used as a specific method for calculating the colorimetric values of the colorimetric patterns CP.

As described above, the colorimetric camera 20 irradiates the margin of the print medium M on which no colorimetric pattern CP is formed with light from the medium type determining light source 29 before performing the colorimetry of the colorimetric patterns CP to image the print medium M. The colorimetric camera 20 determines the intensity of the specular light on the print medium M from the image obtained by the imaging, and based on the intensity of the specular light, determines the type of the print medium M. Information indicating the type of the print medium M determined by the colorimetric camera 20 is sent to the CPU 101 through the control FPGA 110.

Configuration of Control Mechanism of Colorimetric Camera

Figure 8:
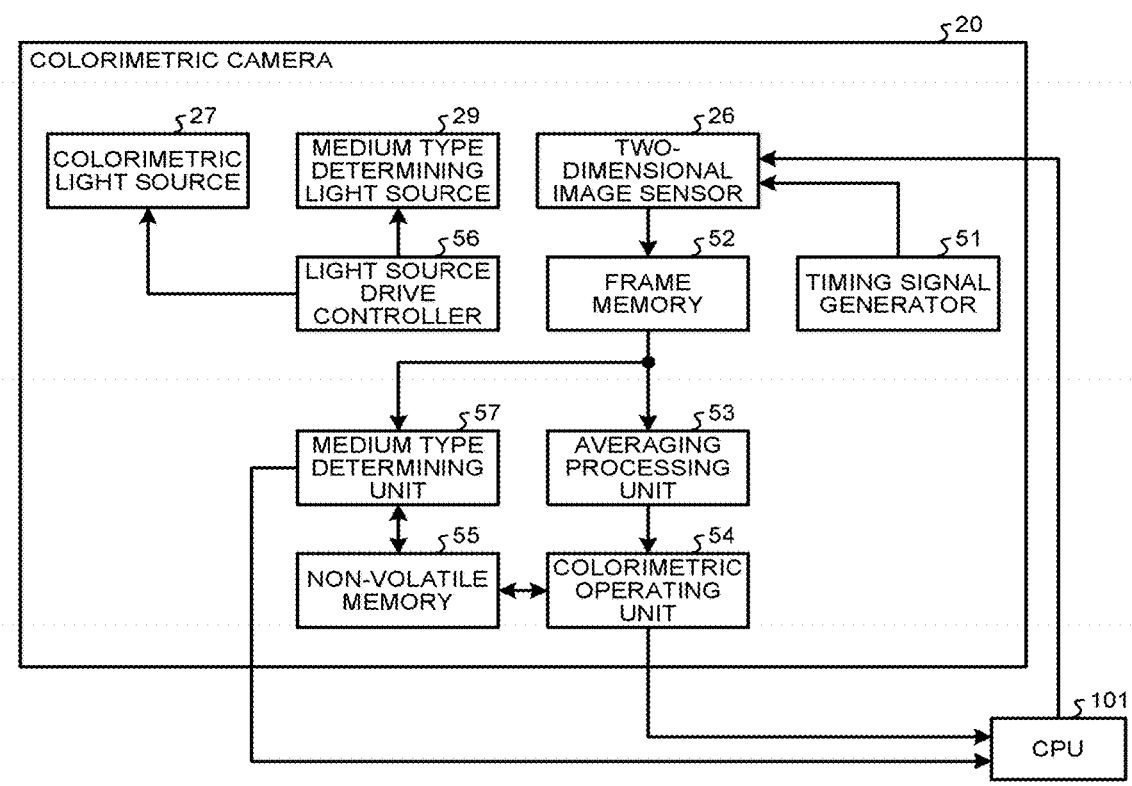
FIG. 8 is a control block diagram of the colorimetric camera.

Next, a control mechanism of the colorimetric camera 20 will be described specifically with reference to FIG. 8. FIG. 8 is a block diagram illustrating a configuration example of the control mechanism of the colorimetric camera 20.

As illustrated in FIG. 8, the colorimetric camera 20 includes the two-dimensional image sensor 26, the colorimetric light source 27, the medium type determining light source 29, a timing signal generator 51, a frame memory 52, an averaging processing unit 53, a colorimetric operating unit 54, a non-volatile memory 55, a light source drive controller 56, and a medium type determining unit 57. These units are, for example, mounted on the substrate 22 constituting the top face of the housing 23 of the colorimetric camera 20.

The two-dimensional image sensor 26 converts light that has entered the two-dimensional image sensor 26 into an electric signal and outputs image data imaging the area to be imaged. The two-dimensional image sensor 26 incorporates the function that AD-converts an analog signal obtained by photoelectric conversion into digital image data, performs various types of image processing such as shading correction, white balance correction, γ correction, and image data format conversion on the image data, and outputs the resulting image data. The setting of various types of operation conditions of the two-dimensional image sensor 26 is performed in accordance with various types of setting signals from the CPU 101. Part or the whole of the various types of image processing on the image data may be performed outside the two-dimensional image sensor 26.

The timing signal generator 51 generates a timing signal that controls the timing of start of imaging by the two-dimensional image sensor 26 and supplies the timing signal to the two-dimensional image sensor 26. The present embodiment performs imaging by the two-dimensional image sensor 26 not only when the colorimetry of the colorimetric patterns CP is performed, but also when the type of the print medium M is determined. The timing signal generator 51 generates the timing signal that controls the timing of start of imaging by the two-dimensional image sensor 26 when performing the colorimetry of the colorimetric patterns CP and when determining the type of the print medium M and supplies the timing signal to the two-dimensional image sensor 26.

The frame memory 52 temporarily stores therein the image output by the two-dimensional image sensor 26.

The averaging processing unit 53 extracts an area to be subjected to colorimetry set near the central part of an area reflecting the colorimetric patterns CP and an area reflecting the respective reference patches of the reference chart 40 from the image imaged by the two-dimensional image sensor 26 and temporarily stored in the frame memory 52 when performing the colorimetry of the colorimetric patterns CP. The averaging processing unit 53 averages the image data of the extracted area to be subjected to colorimetry, outputs the obtained values to the colorimetric operating unit 54 as the RGB values of the colorimetric patterns CP, averages each of the pieces of image data of the area reflecting the respective reference patches, and outputs the obtained values to the colorimetric operating unit 54 as the RGB of the respective reference patches.

The colorimetric operating unit 54 calculates the colorimetric values of the colorimetric patterns CP based on the RGB values of the colorimetric patterns CP and the RGB values of the respective patches of the reference chart 40 obtained by the processing by the averaging processing unit 53. The colorimetric values of the colorimetric patterns CP calculated by the colorimetric operating unit 54 are sent to the CPU 101 on the main control board 120. The colorimetric operating unit 54 can calculate the colorimetric values of the colorimetric patterns CP by a method disclosed in, for example, Japanese Laid-open Patent Publication No. 2013-051671, and a detailed description of the processing by the colorimetric operating unit 54 is omitted.

The non-volatile memory 55 stores therein various types of data required for calculating the colorimetric values of the colorimetric patterns CP by the colorimetric operating unit 54, a table to which the medium type determining unit 57 refers when determining the type of the print medium M, and the like.

The light source drive controller 56 generates light source drive signals for turning on the colorimetric light source 27 and the medium type determining light source 29 and supplies the signals to the colorimetric light source 27 and the medium type determining light source 29. As described above, the colorimetric camera 20 according to the present embodiment performs imaging by the two-dimensional image sensor 26 under irradiation by the colorimetric light source 27 when performing the colorimetry of the colorimetric patterns CP and performs imaging by the two-dimensional image sensor 26 under irradiation by the medium type determining light source 29 when determining the type of the print medium M. The light source drive controller 56 supplies a light source drive signal for turning on the colorimetric light source 27 to the colorimetric light source 27 when performing the colorimetry of the colorimetric patterns CP and supplies a light source drive signal for turning on the medium type determining light source 29 to the medium type determining light source 29 when determining the type of the print medium M.

The medium type determining unit 57 determines the type of the print medium M on which the colorimetric patterns CP are printed. The determination of the type of the print medium M is performed, for example, prior to the colorimetry of the colorimetric patterns CP.

When determining the type of the print medium M, the margin of the print medium M is irradiated with the light from the medium type determining light source 29. Reflected light from the print medium M including specular light of the medium type determining light source 29 is received by the two-dimensional image sensor 26, thereby outputting an image from the two-dimensional image sensor 26. The medium type determining unit 57 detects an optical image of the specular light regularly reflected by the margin of the print medium M from the image output by the two-dimensional image sensor 26 and determines the intensity of the specular light from the brightness value of the optical image. The medium type determining unit 57 refers to the table stored in advance in, for example, the non-volatile memory 55 and determines the type of the print medium M corresponding to the determined intensity of the specular light, thereby determining the type of the print medium M. Information indicating the type of the print medium M determined by the medium type determining unit 57 is sent to the CPU 101 on the main control board 120 and is used for, for example, correcting the colorimetric values of the colorimetric patterns CP calculated by the colorimetric operating unit 54 in accordance with the type of the print medium M.

The table referred to by the medium type determining unit 57 describes the intensity of specular light for each of the types of the print medium M handled by the image forming apparatus 100. The table is created in advance by, for example, performing experiments that determine the intensity of the specular light for each of the types of the print medium M and is stored in the non-volatile memory 55.

Although the present embodiment describes a case in which the type of the print medium M on which the colorimetric patterns CP as a colorimetric object are printed is determined, the medium type determining unit 57 can determine, not only the print medium M on which the colorimetric patterns CP are printed, but also types of various print media M for use in the printing by the image forming apparatus 100.

As described above in detail with reference to specific examples, the colorimetric camera 20 of the present embodiment includes the light shielding wall 30 that shields the light directed from the medium type determining light source 29 toward the second specular position LP2 without shielding the light L1 directed from the medium type determining light source 29 toward the first specular position LP1. Consequently, the colorimetric camera 20 can effectively prevent the inconvenience that the specular light at the second specular position LP2 interferes with the specular light at the first specular position LP1 in the image imaged by the two-dimensional image sensor 26, accurately determine the intensity of the specular light in the margin of the print medium M from the image imaged by the two-dimensional image sensor 26, and accurately determine the type of the print medium M.

Modifications of Colorimetric Camera

Next, modifications (a first modification to a third modification) of the colorimetric camera 20 of the present embodiment will be described. Below, the colorimetric camera 20 of the first modification, the colorimetric camera 20 of the second modification, and the colorimetric camera 20 of the third modification will be written as a colorimetric camera 20A, a colorimetric camera 20B, and a colorimetric camera 20C, respectively. In the modifications, components having functions common to those of the colorimetric camera 20 will be attached with the same symbols, and duplicated descriptions thereof will be appropriately omitted.

First Modification

Figure 9:
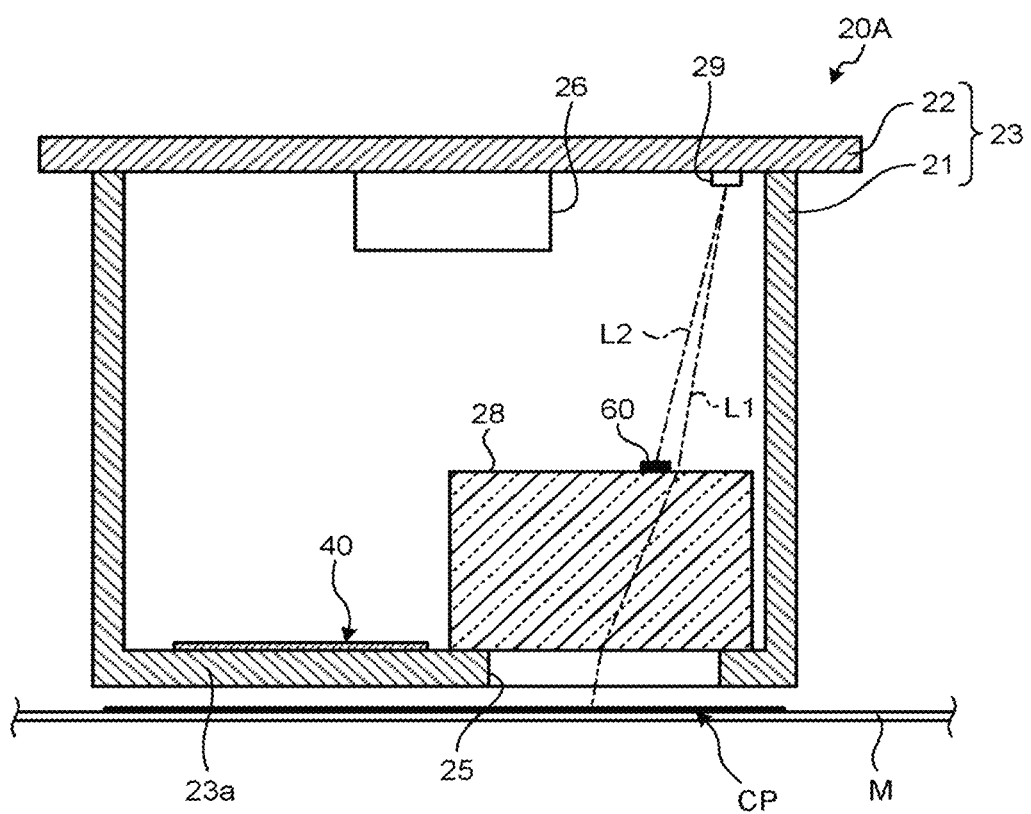
FIG. 9 is a vertical sectional view of a colorimetric camera of a first modification.

FIG. 9 is a vertical sectional view of the colorimetric camera 20A of the first modification and is a sectional view at the same position as the vertical sectional view of the colorimetric camera 20 illustrated in FIG. 4A.

The colorimetric camera 20A of the first modification includes light shielding paint 60 applied to a surface (the top face, for example) of the optical path length changing member 28 as the light shielding unit in place of the light shielding wall 30 of the colorimetric camera 20. The light shielding paint 60 is opaque paint that does not pass the light of the medium type determining light source 29 therethrough and is applied to, for example, the top face of the optical path length changing member 28 so as to shield the light L2 directed from the medium type determining light source 29 toward the second specular position without shielding the light L1 directed from the medium type determining light source 29 toward the first specular position. A piece of opaque tape may be pasted on the surface of the optical path length changing member 28 in place of applying the light shielding paint 60 to the surface of the optical path length changing member 28.

By providing the light shielding paint 60 (or the opaque tape pasted on the surface of the optical path length changing member 28) applied to the surface of the optical path length changing member 28 as the light shielding unit in place of the light shielding wall 30 as in the colorimetric camera 20A of the first modification, an effect similar to that of the colorimetric camera 20 can be obtained with a simpler apparatus configuration than that of the colorimetric camera 20.

Second Modification

Figure 10:
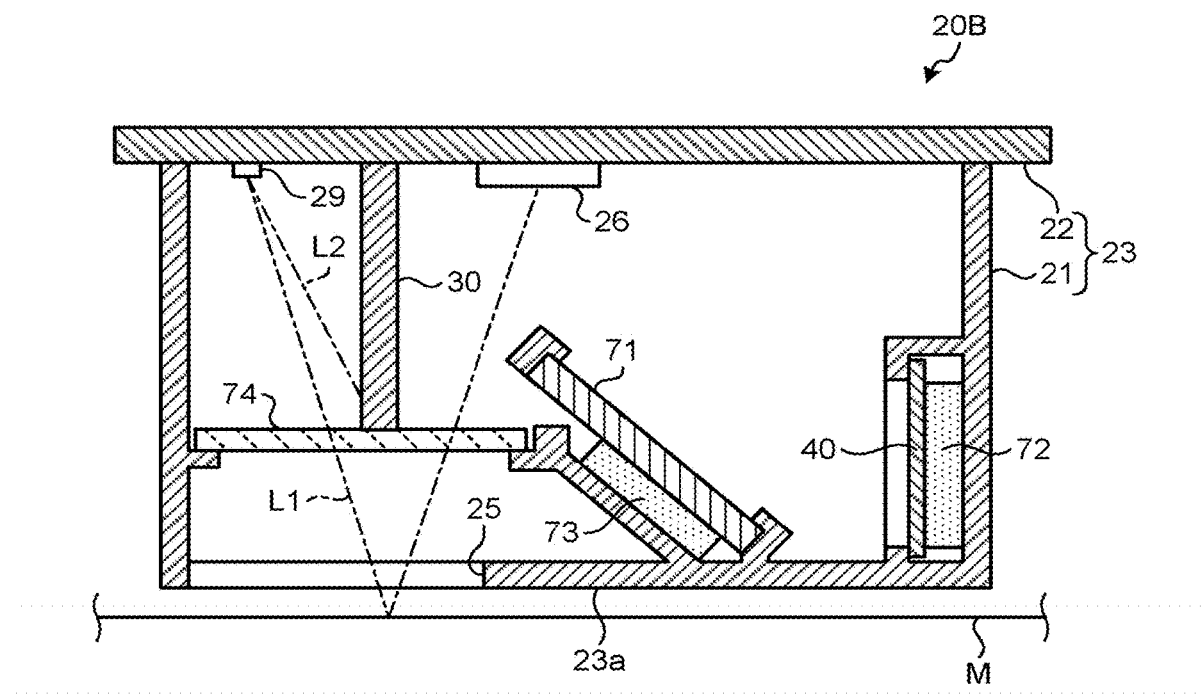
FIG. 10 is a vertical sectional view of a colorimetric camera of a second modification.

FIG. 10 is a vertical sectional view of the colorimetric camera 20B of the second modification and is a sectional view at the same position as the vertical sectional view of the colorimetric camera 20 illustrated in FIG. 4A.

The colorimetric camera 20B of the second modification arranges the reference chart 40 on an inside wall of the frame body 21 constituting a side face of the housing 23, and an optical image of the reference chart 40 is reflected by a reflecting mirror 71 and is caused to enter the two-dimensional image sensor 26. The reference chart 40 is pressed against a structure through, for example, a compressive restoring force of a buffer member 72 to be fixedly arranged in parallel with the inside wall of the frame body 21. The reflecting mirror 71 is pressed against a structure through, for example, a compressive restoring force of a buffer member 73 to be fixedly arranged inclined by a certain angle with respect to the bottom face 23a of the housing 23.

The colorimetric camera 20B of the second modification reflects the optical image of the reference chart 40 by the reflecting mirror 71 and causes the optical image of the reference chart 40 to enter the two-dimensional image sensor 26, thereby bringing the optical path length from the two-dimensional image sensor 26 to the reference chart 40 close to the optical path length from the two-dimensional image sensor 26 to the colorimetric patterns CP. With this configuration, the colorimetric camera 20B of the second modification eliminates the optical path length changing member 28 of the colorimetric camera 20. However, when the opening 25 of the housing 23 is left open, ink mist, dust, or the like entering the inside of the housing 23 via the opening 25 may adhere to components such as the two-dimensional image sensor 26, the colorimetric light source 27 (not illustrated in FIG. 10), the medium type determining light source 29, and the reference chart 40, thereby affecting the colorimetry of the colorimetric patterns CP and the determination of the type of the print medium M. Given this situation, the colorimetric camera 20B of the second modification provides a cover member 74 for preventing ink mist, dust, or the like entering the inside of the housing 23 from adhering to the components within the housing 23.

The cover member 74 is a light transmission member having sufficient transmittance for the light from the colorimetric light source 27 and the medium type determining light source 29 and is arranged in an optical path of the light directed from the medium type determining light source 29 toward the subject (the margin of the print medium M) outside the housing 23. Given this situation, the colorimetric camera 20B of the second modification provides the light shielding wall 30 similarly to the colorimetric camera 20 in order to prevent specular light on the surface of the cover member 74 from entering the two-dimensional image sensor 26 when the medium type determining light source 29 is turned on. Specifically, a position on the margin of the print medium M that is the subject at which the light from the medium type determining light source 29 is regularly reflected and enters the two-dimensional image sensor 26 is defined as the first specular position, whereas a position on the surface of the cover member 74 at which the light from the medium type determining light source 29 is regularly reflected and enters the two-dimensional image sensor 26 is defined as the second specular position. In this situation, the light shielding wall 30 is arranged within the housing 23 so as to shield the light L2 (refer to FIG. 10) directed from the medium type determining light source 29 toward the second specular position without shielding the light L1 (refer to FIG. 10) directed from the medium type determining light source 29 toward the first specular position.

As described above, the colorimetric camera 20B of the second modification, similarly to the colorimetric camera 20, includes the light shielding wall 30 that shields the light L2 directed from the medium type determining light source 29 toward the second specular position without shielding the light L1 directed from the medium type determining light source 29 toward the first specular position. Consequently, the colorimetric camera 20B of the second modification, similarly to the colorimetric camera 20, can effectively prevent the inconvenience that the specular light at the second specular position LP2 interferes with the specular light at the first specular position LP1 in the image imaged by the two-dimensional image sensor 26, accurately determine the intensity of the specular light in the margin of the print medium M from the image imaged by the two-dimensional image sensor 26, and accurately determine the type of the print medium M.

Third Modification

Figure 11:
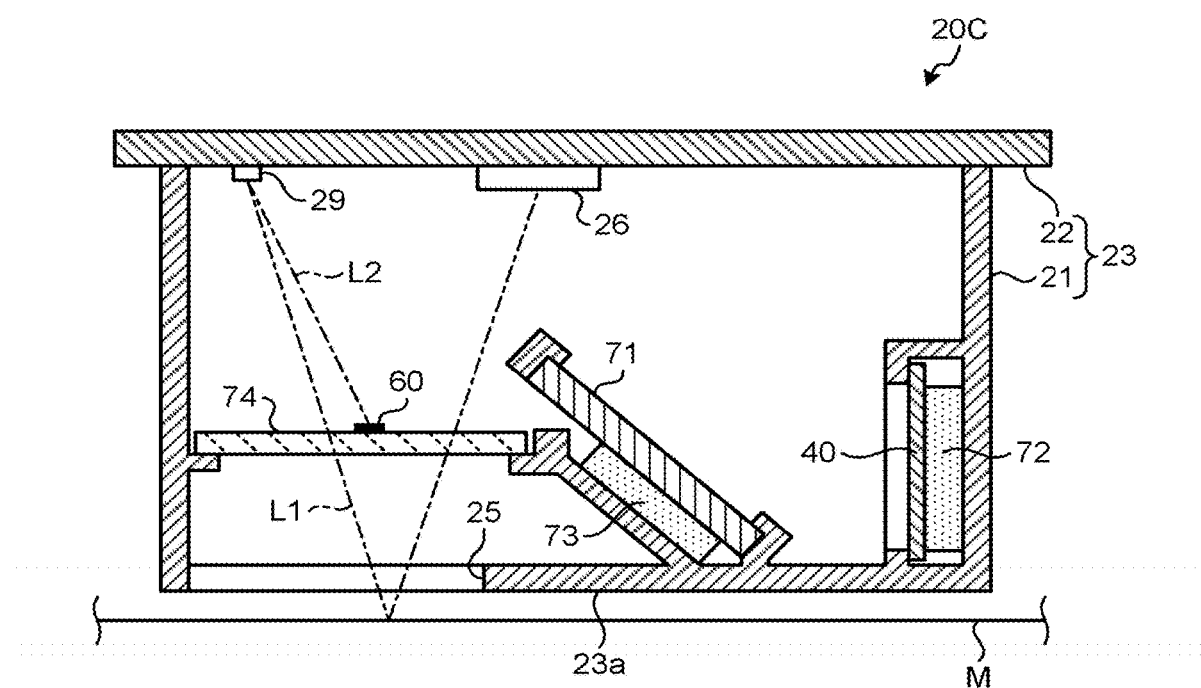
FIG. 11 is a vertical sectional view of a colorimetric camera of a third modification.

FIG. 11 is a vertical sectional view of the colorimetric camera 20C of the third modification and is a sectional view at the same position as the vertical sectional view of the colorimetric camera 20 illustrated in FIG. 4A.

The colorimetric camera 20C of the third modification includes light shielding paint 60 applied to a surface (the top face as a face facing the substrate 22) of the cover member 74 as the light shielding unit in place of the light shielding wall 30 of the colorimetric camera 20B. The light shielding paint 60 is opaque paint that does not pass the light of the medium type determining light source 29 therethrough and is applied to, for example, the top face of the cover member 74 so as to shield the light L2 directed from the medium type determining light source 29 toward the second specular position without shielding the light L1 directed from the medium type determining light source 29 toward the first specular position. A piece of opaque tape may be pasted on the surface of the cover member 74 in place of applying the light shielding paint 60 to the surface of the cover member 74.

By providing the light shielding paint 60 (or the opaque tape pasted on the surface of the cover member 74) applied to the surface of the cover member 74 as the light shielding unit in place of the light shielding wall 30 as in the colorimetric camera 20C of the third modification, an effect similar to that of the colorimetric camera 20B of the second modification can be obtained with a simpler configuration than that of the colorimetric camera 20B of the second modification.

Other Modifications

Although the above embodiment exemplifies the image forming apparatus 100 configured as the serial head type inkjet printer, the present invention can be effectively applied to, not limited to the above example, various types of image forming apparatuses. When the present invention is applied to a line head type inkjet printer, for example, a plurality of colorimetric cameras 20 may be arranged in order in a direction orthogonal to a conveyance direction of the print medium M. When the present invention is applied to an electrophotographic image forming apparatus, a plurality of colorimetric cameras 20 may be arranged in order in a direction orthogonal to a conveyance direction of the print medium M at any position in a conveyance path of the print medium M at least after fixation.

Although in the above embodiment the colorimetric camera 20 has the function to calculate the colorimetric values of the colorimetric patterns CP, the colorimetric values of the colorimetric patterns CP may be calculated outside the colorimetric camera 20. It can be configured that, for example, the CPU 101 or the control FPGA 110 mounted on the main control board 120 of the image forming apparatus 100 calculates the colorimetric values of the colorimetric patterns CP. In this case, the colorimetric camera 20 sends the RGB values of the colorimetric patterns CP and the reference chart 40 to the CPU 101 or the control FPGA 110 in place of the colorimetric values of the colorimetric patterns CP. In other words, the colorimetric camera 20 is configured as an imaging device including no function to calculate colorimetric values.

The control functions of the units constituting the image forming apparatus 100 and the colorimetric camera 20 (the medium type determining apparatus) according to the present embodiment can be implemented by hardware, software, or any complex configuration of the both. When the control functions of the units constituting the image forming apparatus 100 and the colorimetric camera 20 (the medium type determining apparatus) according to the present embodiment are implemented by software, each processor included in the image forming apparatus 100 and the colorimetric camera 20 (the medium type determining apparatus) executes a program that describes a processing sequence. The program executed by the processor is, for example, embedded and provided in a ROM or the like within the image forming apparatus 100 and the colorimetric camera 20 (the medium type determining apparatus). The program executed by the processor may be recorded and provided in a computer-readable recording medium such as a CD-ROM, a flexible disk (FD), a CD-R, and a digital versatile disc (DVD), as an installable or executable file.

The program executed by the processor may be stored in a computer connected to a network such as the Internet and provided by being downloaded via the network. The program executed by the processor may be provided or distributed via a network such as the Internet.

Although the specific embodiment of the present invention has been described in detail, the present invention is not limited to the above embodiment as it is and can be embodied with various modifications or alterations applied without departing from the essence thereof in the stage of implementation.

Conventional technologies are described in Japanese Laid-open Patent Publication No. 2012-194445, for example.

The present invention produces the effect of accurately detecting specular light from a subject.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An imaging device comprising:
   a light source that emits light;
   a two-dimensional image sensor that receives reflected light from a subject containing specular light of the light source and outputs an image of the subject;
   a light transmission member disposed in an optical path of light emitted from the light source to the subject; and
   a light shielding unit disposed in a part of an optical path of light emitted from the light source to the light transmission member,
   wherein a first specular position is a position on the subject at which light from the light source is reflected and enters the two-dimensional image sensor,
   wherein a second specular position is a position on the light transmission member at which light from the light source is reflected and enters the two-dimensional image sensor, and
   wherein the light shielding unit shields light from the light source directed toward the second specular position without shielding light directed from the light source toward the first specular position.

2. The imaging device according to claim 1, wherein the light shielding unit is a fixed member that fixes the light transmission member within a housing.

3. The imaging device according to claim 1, wherein the light shielding unit is paint applied to a surface of the light transmission member.

4. A medium type determining device comprising:
   the imaging device according to claim 1; and
   a determining unit that determines a type of a print medium on which an image is printed based on an image of the print medium output by the two-dimensional image sensor when the imaging device performs imaging of the print medium being the subject.

5. An image forming apparatus comprising the medium type determining device according to claim 4.

6. The imaging device according to claim 1, further comprising a colorimetric light source that emits colorimetric patterns on the subject,
   wherein the subject is a margin of a print medium, and
   wherein the light source is a medium type determining light source that emits the light to determine a type of the print medium.

7. An imaging device comprising:
   a light source that emits light;
   a two-dimensional image sensor that receives reflected light from a subject containing specular light of the light source and outputs an image of the subject;
   a light transmission member disposed in an optical path of light emitted from the light source to the subject; and
   a light shielding wall that shields at least some of the light directed from the light source,
   wherein a first specular position is a position on the subject at which light from the light source is reflected and enters the two-dimensional image sensor,
   wherein a second specular position is a position on the light transmission member at which light from the light source is reflected and enters the two-dimensional image sensor, and
   wherein the light shielding wall shields light from the light source directed toward the second specular position without shielding light directed from the light source toward the first specular position.

8. An imaging device comprising:
   a light source that emits light;
   a two-dimensional image sensor that receives reflected light from a subject containing specular light of the light source and outputs an image of the subject;
   a light transmission member disposed in an optical path of light emitted from the light source to the subject; and
   a light shielding film disposed on a part of a surface of the light transmission member,
   wherein a first specular position is a position on the subject at which light from the light source is reflected and enters the two-dimensional image sensor,
   wherein a second specular position on the light transmission member at which light from the light source is reflected and enters the two-dimensional image sensor, and
   wherein the light shielding film shields light from the light source directed toward the second specular position without shielding light directed from the light source toward the first specular position.

* * * * *